US007512246B2

(12) United States Patent
Nishitani et al.

(10) Patent No.: US 7,512,246 B2
(45) Date of Patent: Mar. 31, 2009

(54) STEREO SOUNDING METHOD, STEREO SOUNDING SYSTEM, AND MUSICAL TONE GENERATION CONTROL SYSTEM

(75) Inventors: Yoshiki Nishitani, Shizuoka-ken (JP); Kenichi Miyazawa, Shizuoka-ken (JP); Akira Miki, Shizuoka-ken (JP); Kenji Ishida, Shizuoka-ken (JP)

(73) Assignee: Yamaha Corporation, Shizuoka-Ken (JP)

( * ) Notice: Subject to any disclaimer, the term of this patent is extended or adjusted under 35 U.S.C. 154(b) by 969 days.

(21) Appl. No.: 10/834,817

(22) Filed: Apr. 28, 2004

(65) Prior Publication Data

US 2004/0213412 A1 Oct. 28, 2004

(30) Foreign Application Priority Data

Apr. 28, 2003 (JP) ............................ 2003-124193

(51) Int. Cl.
*H04B 1/00* (2006.01)

(52) U.S. Cl. ............................ 381/119; 381/61; 381/1; 84/626; 84/658

(58) Field of Classification Search .................. 381/27, 381/119, 1, 17, 61, 18, 19, 310; 84/600, 84/626, 658, 625; 446/397; 463/35
See application file for complete search history.

(56) References Cited

U.S. PATENT DOCUMENTS

| | | | | |
|---|---|---|---|---|
| 5,170,002 | A * | 12/1992 | Suzuki et al. | 84/600 |
| 5,192,823 | A * | 3/1993 | Suzuki et al. | 84/600 |
| 5,290,964 | A * | 3/1994 | Hiyoshi et al. | 84/600 |
| 6,011,851 | A * | 1/2000 | Connor et al. | 381/17 |
| 7,206,421 | B1 * | 4/2007 | Taenzer | 381/119 |
| 2001/0015123 | A1 | 8/2001 | Nishitani et al. | |
| 2003/0070537 | A1 | 4/2003 | Nishitani et al. | |

FOREIGN PATENT DOCUMENTS

| | | |
|---|---|---|
| JP | 09/271095 | 10/1997 |
| JP | 2001-211495 | 8/2001 |

* cited by examiner

*Primary Examiner*—Vivian Chin
*Assistant Examiner*—Jason R Kurr
(74) *Attorney, Agent, or Firm*—Harness, Dickey & Pierce, PLC

(57) ABSTRACT

A stereo sounding method which can provide realistic sounds such as stereo sounds for a large number of listeners while reducing the number of speakers. A stereo sounding system is comprised of a plurality of stereo sound sources, and a plurality of speakers. A smaller number of speakers than twice the number of the plurality of stereo sound sources are arranged, and an R-channel output from at least one stereo sound source among the plurality of stereo sound sources and an L-channel output from a stereo sound source other than the at least one stereo sound source are mixed, and the mixing result is output to at least one of the arranged speakers.

9 Claims, 11 Drawing Sheets

STEREO SOUNDING METHOD, STEREO SOUNDING SYSTEM, AND MUSICAL TONE GENERATION CONTROL SYSTEM

BACKGROUND OF THE INVENTION

1. Field of the Invention

The present invention relates to a stereo sounding method, a stereo sounding system, and a musical tone generation control system.

2. Description of the Related Art

In general, a stereo speaker system which is now widely used is comprised of right and left speakers arranged at a predetermined interval in front of a listener.

The listener listens to stereo sounds and others output from the pair of speakers from a position where he/she sees the pair of speakers ahead on the right and left. In this speaker system, however, the listener cannot listen to desirable sounds such as stereo sounds if he/she does not lie at a position where he/she sees the pair of spears ahead on the right and left as above. In other words, if the listener moves to become close to one of the speakers, or if the listener lies at a position where the right and left speakers are overlapped in the same direction, the listener cannot listen to desirable sounds such as stereo sounds. Also, if a large number of listeners lie around the speaker system, only part of the listeners can listen to desirable sounds such as stereo sounds.

To address the above problems, speaker systems illustrated in FIGS. 9 and 10 have been proposed, for example.

The speaker system in FIG. 9 is comprised of speakers L1 to L9 which output an L-channel output from a stereo sound source, not shown, and speakers R1 to R8 which output an R-channel output from the stereo sound source. These speakers L1 to L9 and R1 to R8 are alternately arranged on the circumference of the generally cylindrical housing. The speakers R1 to R8 and L1 to L8 are arranged such that the angle formed by a straight line connecting the center of the circle, i.e. the diametrical center of the housing, to the center of each speaker and a normal line extending vertically from the center of each speaker is kept at an angle θ (θ=57°), and the stereo sound radiation angle formed by speakers whose radiation surfaces are adjacent in opposed relation (for example, the speakers R4 and L4) is kept at 90°.

This speaker system can provide realistic sounds such as stereo sounds for a large number of listeners (refer to Japanese Laid-Open Patent Publication (Kokai) No. 2001-211495 (page 2, and FIGS. 1 and 2))

The speaker system in FIG. 10 is constructed such that a plurality of speakers are arranged in a radial array. A sound output signal in a left channel and a sound output signal in a right channel are supplied to each speaker, and a sound corresponding to each signal is output from each speaker. According to this speaker system, it is possible to acquire a correct sound image localization in a predetermined direction. Also, it is possible to listen to a reproduced sound even in e.g. a direction opposite to a predetermined direction (in this case, however, the sound image localization is opposite to the above correct sound image localization). As a result, a listener can feel as if he/she were listening to sounds output from the back surface of a sound source (refer to Japanese Laid-Open Patent Publication (Kokai) No. H09-271095 (pages 2 and 3, and FIGS. 1 and 2).

By the way, the above described speaker systems in FIGS. 9 and 10 are configured to reproduce sounds from a single sound source. Further, in the speaker system in FIG. 10, it is not assumed that it reproduces sounds from a plurality of sound sources. Thus, if it is necessary to reproduce sounds from a plurality of sound sources as in performance of an ensemble of electronic instruments, sounds from the sound sources are mixed before they are supplied to speakers, and the resulting mixed sound is reproduced by the speaker system.

A speaker system in FIG. 11 is an improvement of the speaker system in FIG. 10, which is capable of reproducing sounds from a plurality of sound sources.

This speaker system is similar to the speaker system in FIG. 10 in that speakers are arranged in a substantially circular array inside a large number of listeners, but is different from the speaker system in FIG. 10 in that sounds such as stereo sounds can be provided for the listeners. This speaker system is comprised of first to tenth speakers SP1 to SP10 which are arranged in respective pairs and in respective directions. The speakers SP1 to SP10 are connected to respective corresponding stereo sound sources; the first speaker SP1 and the second speaker SP2 are connected to an L-channel and an R-channel, respectively, of a first stereo sound source, the third speaker SP3 and the fourth speaker SP4 are connected to an L-channel and an R-channel, respectively, of a second stereo sound source, and similarly, each of the fifth to tenth speakers SP5 to SP10 is connected to an L-channel or R channel of a corresponding stereo sound source.

According to the speaker system in FIG. 11, the speakers of each of the pairs arranged in various directions are connected to respective L- and R-channels of a corresponding stereo sound source, and therefore it is possible to provide realistic sounds such as stereo sounds for a large number of listeners.

The speaker system in FIG. 11, however, has the problem that the speakers have to be arranged in pairs and in respective different directions, and hence a large number of speakers are required, which causes a rise in production cost.

Also, the speaker system in FIG. 11 has the problem that a large number of speakers have to be accommodated in a housing, and hence the housing must be large in size and is therefore inconvenient for carrying.

SUMMARY OF THE INVENTION

It is therefore an object of the present invention to provide a stereo sounding method, a stereo sounding system, and a musical tone generation control system which are capable of providing realistic sounds such as stereo sounds for a large number of listeners while suppressing the number of speakers.

To attain the above object, in a first aspect of the present invention, there is provided a stereo sounding method for a stereo sounding system which comprises a plurality of stereo sound sources, and a smaller number of speakers than twice the number of the plurality of stereo sound sources comprises an arranging step of arranging a smaller number of speakers than twice the number of the plurality of stereo sound sources, and a mixing output step of mixing an R-channel output from at least one stereo sound source among the plurality of stereo sound sources and an L-channel output from a stereo sound source other than the at least one stereo sound source, and outputting a mixing result to at least one of the arranged speakers.

According to the first aspect of the present invention, it is possible to reduce the number of speakers required for stereo sounding, which conventionally has to be twice as many as stereo sound sources while providing realistic sounds such as stereo sounds for a large number of listeners.

For example, a total of four speakers (two L-channel speakers and two R-channel speakers) are required to realize using two stereo sound sources according to the prior art, but according to the first aspect of the present invention, an R-channel output from at least one stereo sound source among a plurality of stereo sound sources and an L-channel output from a stereo sound source other than the at least one stereo sound source are mixed, and the mixing result is output to at least one speaker. Therefore, the one speaker serves as an R-channel speaker for one stereo sound source and as an L-channel speaker for the other stereo sound source, and as a result, the number of speakers required for stereo sounding can be reduced.

To attain the above object, in a second aspect of the present invention, there is provided a stereo sounding method for a stereo sounding system which comprises a plurality of stereo sound sources, and a smaller number of speakers than twice the number of the plurality of stereo sound sources comprises an arranging step of arranging a smaller number of speakers than twice the number of the plurality of stereo sound sources, and a mixing output step of mixing an R-channel output from at least one stereo sound source among the plurality of stereo sound sources and an L-channel output from a stereo sound source other than the at least one stereo sound source, and outputting a mixing result to two adjacent speakers among the arranged speakers, wherein the mixing output step comprises carrying out mixing such that the R-channel output and an L-channel output from the at least one stereo sound source among the plurality of stereo sound sources are output from the two adjacent speakers, respectively.

According to the second aspect of the present invention, the number of speakers required for stereo sounding can be reduced in the case where a plurality of speakers are arranged at substantially regular intervals in a substantially linear array while providing realistic sounds such as stereo sounds for a large number of listeners.

To attain the above object, in a third aspect of the present invention, there is provided a stereo sounding method for a stereo sounding system which comprises a plurality of stereo sound sources, and a plurality of speakers corresponding in number to the number of the plurality of stereo sound sources comprises an arranging step of arranging the plurality of speakers in a substantially circular array, a mixing output step of mixing an R-channel output from one stereo sound source among the plurality of stereo sound sources and an L-channel output from a stereo sound source other than the one stereo sound source, and outputting a mixing result to each of the arranged plurality of speakers, wherein the mixing output step comprises carrying out mixing such that an R-channel output and an L-channel output from each stereo sound source among the plurality of stereo sound sources are output from two adjacent speakers of the arranged plurality of speakers, respectively.

According to the third aspect of the present invention, the number of speakers required for stereo sounding can be reduced in the case where a plurality of speakers are arranged in a substantially circular array while providing realistic sounds such as stereo sounds for a large number of listeners.

To attain the above object, in a fourth aspect of the present invention, there is provided a stereo sounding system comprises a plurality of stereo sound sources, a plurality of speakers corresponding in number to the number of the plurality of stereo sound sources, and a mixing apparatus that is connected to the plurality of stereo sound sources and the plurality of speakers such that the mixing apparatus mixes an R-channel output from at least one stereo sound source among the plurality of stereo sound sources and an L-channel output from a stereo sound source other than the at least one stereo sound source, and outputs a mixing result to a speaker connected to the at least one stereo sound source and the stereo sound source other than the at least one stereo sound source, wherein the plurality of speakers are arranged in a substantially circular array, and the mixing apparatus carries out mixing such that an R-channel output and an L-channel output from each stereo sound source of the plurality of stereo sound sources are output from two adjacent speakers of the plurality of speakers, respectively.

According to the fourth aspect of the present invention, the same effects as in the third aspect can be obtained.

To attain the above object, in a fifth aspect of the present invention, there is provided a stereo sounding system comprises first to nth stereo sound sources where n is a natural number equal to or greater than 2, first to nth mixing apparatuses, and first to nth speakers arranged in ascending order in a substantially circular array, wherein the first to nth mixing apparatuses are connected to the first to nth stereo sound sources and the first to nth speakers such that, where k is a natural number equal to or greater than 1 and equal to or smaller than (n−1), a kth mixing apparatus mixes an R-channel output from a kth stereo sound source and an L-channel output from a (k+1)th stereo sound source, and outputs a mixing result to the kth speaker, and the nth mixing apparatus mixes an R-channel output from the nth stereo sound source and an L-channel output from the first stereo sound source, and outputs a mixing result to the nth speaker.

According to the fifth aspect of the present invention, the same effects as in the third aspect can be obtained.

To attain the above object, in a sixth aspect of the present invention, there is provided a musical tone generation control system comprises an operating terminal capable of being carried by an operator, comprising a generating device that detects motion of the operating terminal caused by motion of the operator and generates motion information, and a transmitting device that transmits the motion information, and a musical tone generating apparatus comprising a receiving device that receives the motion information, and a stereo sounding device that sounds a stereo sound based on the motion information received by the receiving device, wherein the stereo sounding device comprises a plurality of stereo sound sources, a plurality of speakers arranged in a substantially circular array and corresponding in number to the number of the plurality of stereo sound sources, and a mixing apparatus that is connected to the plurality of stereo sound sources and the plurality of speakers such that the mixing apparatus mixes an R-channel output from at least one stereo sound source among the plurality of stereo sound sources and an L-channel output from a stereo sound source other than the at least one stereo sound source, and outputs a mixing result to a speaker connected to the at least one stereo sound source and the stereo sound source other than the at least one stereo sound source, and wherein the mixing apparatus carries out mixing such that an R-channel output and an L-channel output from each stereo sound source of the plurality of stereo sound sources are output from two adjacent speakers of the plurality of speakers, respectively.

According to the sixth aspect of the present invention, the same effects as in the third aspect can be obtained.

To attain the above object, in a seventh aspect of the present invention, there is provided a stereo sounding method for a stereo sounding system which comprises at least 2n ($n \geqq 2$) speakers, and one stereo sound source comprising an L-channel and an R-channel, wherein the at least 2n ($n \geqq 2$) speakers are connected to the L-channel or the R-channel of the one stereo sound source comprises a step of arranging the at least 2n ($n \geqq 2$) speakers at substantially regular intervals and in a substantially circular array, and a step of connecting one speaker among the at least 2n ($n \geqq 2$) speakers and at least one speaker adjacent to the one speaker to channels of the one stereo sound source such that the channels to which the one speaker and the at least one speaker adjacent to the one speaker are connected are different.

According to the seventh aspect of the present invention, the same effects as in the third aspect can be obtained.

Preferably, the arranging step comprises arranging the plurality of speakers at substantially regular intervals along a moving route of a listener.

According to this construction, a listener who lies between two speakers can listen to stereo sounds via a pair of speakers located ahead of him/her.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. It should be understood that the present invention is not limited to the embodiments described below, but various changes in or to the embodiments may be possible without departing from the spirits of the present invention.

A description will now be given of a first embodiment of the present invention with reference to FIGS. 1 and 2.

Figure 1:
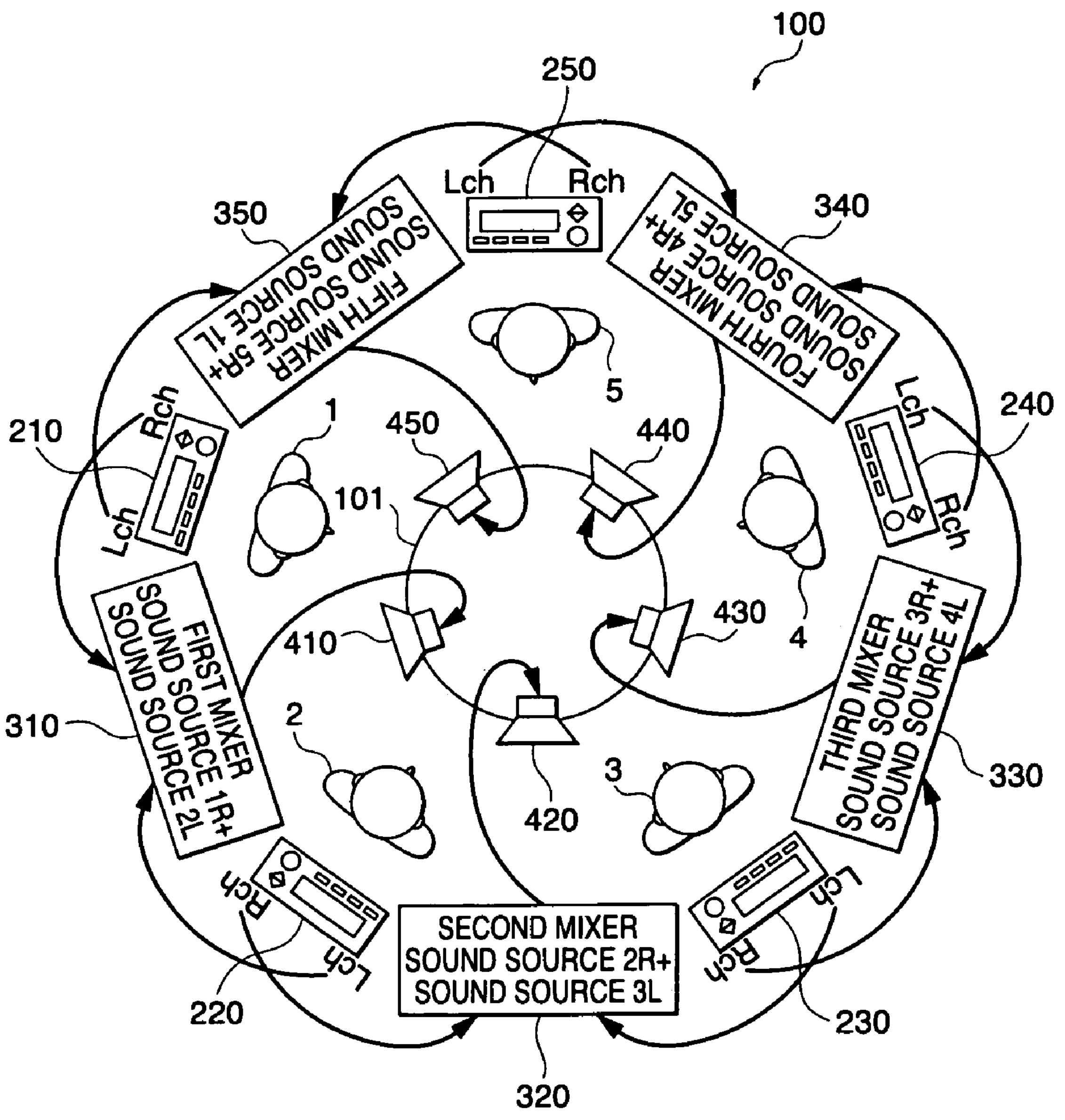
FIG. 1 is a view schematically showing the outline of a stereo sounding system according to a first embodiment of the present invention.
Figure 2:
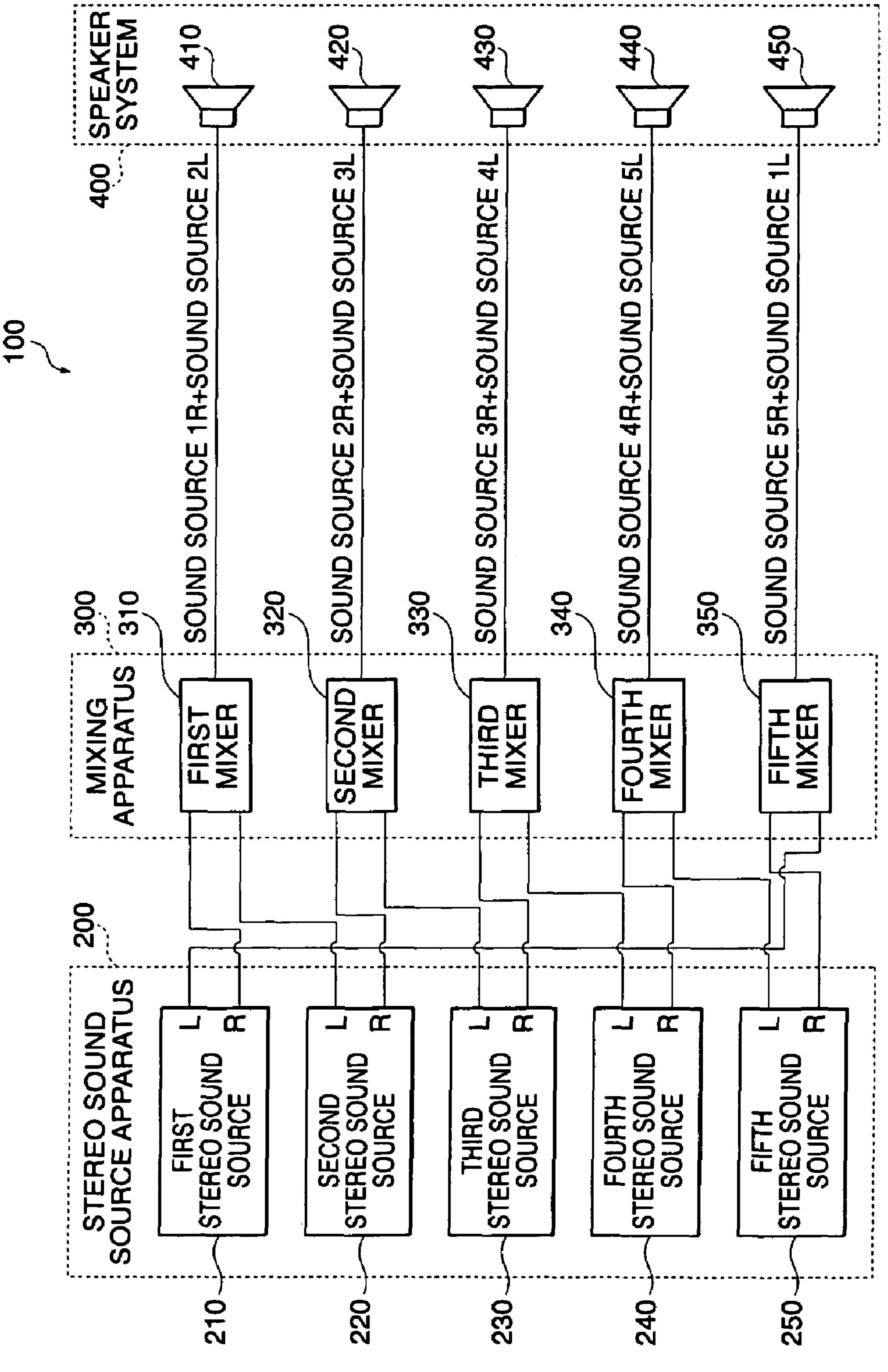
FIG. 2 is a view showing the arrangement of the stereo sounding system in FIG. 1.

FIG. 1 is a view schematically showing the outline of a stereo sounding system 100 according to the first embodiment, and FIG. 2 is a view showing the arrangement of the stereo sounding system 100 in FIG. 1.

As shown in FIG. 2, the stereo sounding system 100 is comprised of a mixing apparatus 300 which is connected to a stereo sound source apparatus 200, and a speaker system 400 which stereophonically sounds an output having been subjected to mixing by the mixing apparatus 300.

The stereo sound source apparatus 200, mixing apparatus 300, and speaker system 400 are comprised of first to fifth stereo sound sources 210 to 215, first to fifth mixers 310 to 350, and first to fifth speakers 410 to 450, respectively. Thus, in the stereo sounding system 100 according to the present embodiment, the same number of stereo sound sources, mixers, and speakers are provided.

As shown in FIG. 1, the first to fifth speakers 410 to 450 are mounted in a housing 101, and arranged in this order along the contour of the housing 101 (in a substantially circular array). The first to fifth speakers 410 to 450 are connected to the respective corresponding first to fifth mixers 310 to 350. It should be noted that a speaker system comprised of the first to fifth speakers 410 to 450 is accommodated in the housing 101. Further, in FIG. 1, the stereo sound sources 210 to 250 and the mixers 310 to 350 are arranged outside the housing 101, but may be arranged within the housing 101.

The first mixer 310 is connected to an R-channel of the first stereo sound source 210 and an L-channel of the second stereo sound source 220, and mixes an R-channel output from the first stereo sound source 210 (referred to as the "sound source 1R" in FIG. 1; the other sound sources will be referred to similarly) and an L-channel output from the second stereo sound source 220 (sound source 2L) and outputs the resulting mixed sound to the first speaker 410. Namely, the first speaker 410 serves as both an R-channel speaker for the first stereo sound source 210 and an L-channel speaker for the second stereo sound source 220.

The second mixer 320 is connected to an R-channel of the second stereo sound source 220 and an L-channel of the third stereo sound source 230, and mixes an R-channel output from the second stereo sound source 220 (referred to as the "sound source 2R") and an L-channel output from the third stereo sound source 230 (sound source 3L) and outputs the resulting mixed sound to the second speaker 420. Namely, the second speaker 420 serves as both an R-channel speaker for the second stereo sound source 210 and an L-channel speaker for the third stereo sound source 230.

Each of the third to fifth mixers 330 to 350 is also connected in the above described manner (refer to FIG. 1). Therefore, the third speaker 430 serves as both an R-channel speaker for the third stereo sound source 230 and an L-channel speaker for the fourth stereo sound source 240, the fourth speaker 440 serves as both an R-channel speaker for the fourth stereo sound source 240 and an L-channel speaker for the fifth stereo sound source 250, and the fifth speaker 450 serves as both an R-channel speaker for the fifth stereo sound source 250 and an L-channel speaker for the first stereo sound source 210.

A listener 1 listens to an L-channel output (sound source 1L) from the fifth speaker 450 located diagonally ahead of him/her on the left, and an R-channel output (sound source 1R) from the first speaker 410 located diagonally ahead of him/her on the right, and therefore listens to a stereo sound from the first stereo sound source 210.

Here, the first speaker 410 outputs the R-channel output (sound source 2L) as well as the L-channel output (sound source 1R) as mentioned above. Thus, a listener 2 who is lying to the listener 1's right listens to the L-channel output (sound source 2L) from the first speaker 410 and the R-channel output (sound source 2R) from the second speaker 420 located diagonally ahead of him/her on the right, and therefore listens to a stereo sound from the second sound source 220.

Similarly, a listener 3 listens to the L-channel output (sound source 3L) from the second speaker 420 located diagonally ahead of him/her on the left, and an R-channel output (sound source 3R) from the third speaker 430 located diagonally ahead of him/her on the right, and therefore listens to a stereo sound from the third stereo sound source 230. A listener 4 listens to an L-channel output (sound source 4L) from the third speaker 430 located diagonally ahead of him/her on the left, and an R-channel output (sound source 4R) from the fourth speaker 440 located diagonally ahead of him/her on the right, and therefore listens to a stereo sound from the fourth stereo sound source 240. A listener 5 listens to an L-channel output (sound source 5L) from the fourth speaker 440 located diagonally ahead of him/her on the left, and an R-channel output (sound source 5R) from the fifth speaker 450 located diagonally ahead of him/her on the right, and therefore listens to a stereo sound from the fifth stereo sound source 250.

As described above, in the stereo sounding system 100 according to the present embodiment, one speaker serves an L-channel speaker for one of two adjacent stereo sound sources and an R-channel speaker for the other one, and each mixer mixes an L-channel output from one of two adjacent sound sources and an R-channel output from the other one so that the resulting mixed sound can be output from one speaker. Namely, mixing is carried out such that an L-channel output and an R-channel output from one stereo sound source can be output from different speakers adjacent to each other. Therefore, each listener can listen to a stereo sound from a pair of speakers (e.g. the first and fifth speakers for the listener 1) located diagonally ahead of him/her on the right and left.

As is apparent from the above description, the stereo sounding system according to the present invention makes it possible to provide realistic sounds such as stereo sounds for a large number of listeners while suppressing the increase in the number of speakers.

Thus, since a smaller number of speakers can provide stereo sounds as compared with the prior art, costs required for e.g. production of the stereo sounding system can be reduced, and also, a housing for the speakers can be reduced in size, weight, and so forth.

It should be noted that although in the present embodiment described above, for the convenience of explanation, the five stereo sound sources 210 to 250, five mixers 310 to 350, and five speakers 410 to 450 constitute the stereo sounding system in accordance with the above explanation of the prior art, the present invention is not limited to this. That is, the present invention may also be applied to the case where first to nth ($n \geqq 2$; the same will apply hereinafter) stereo sound sources, first to nth mixers, and first to nth speakers constitute the stereo sounding system.

Specifically, as is the case with the above described embodiment, the first to nth speakers are arranged in order in a substantially circular array, and the first mixer mixes an R-channel output from a first stereo sound source and an L-channel output from a second stereo sound source, and outputs the mixing result to the first speaker. Similarly, the second mixer mixes an R-channel output from the second stereo sound source and an L-channel output from a third stereo sound source, and outputs the mixing result to the second speaker; in the same manner, the nth mixer mixes an R-channel output from the nth stereo sound source and an L-channel output from the first stereo sound source, and outputs the mixing result to the nth speaker. Therefore, each listener can listen to stereo sounds from a pair of speakers located ahead of him/her. In the present embodiment, the first to fifth speakers 410 to 450 are arranged counterclockwise in this order in the housing 101 and along the contour of the housing 101 (in a substantially circular array), but may be arranged clockwise in this order in the housing 101 and along the contour of the housing 101 (in a substantially circular array).

A description will now be given of a second embodiment of the present invention with reference to FIG. 3.

Although in the above described first embodiment, the stereo sounding system is arranged such that a plurality of speakers are arranged along the contour of the housing 101 (in a substantially circular array), a stereo sounding system according to the second embodiment is arranged such that a plurality of speakers are arranged in a substantially linear array.

Figure 3:
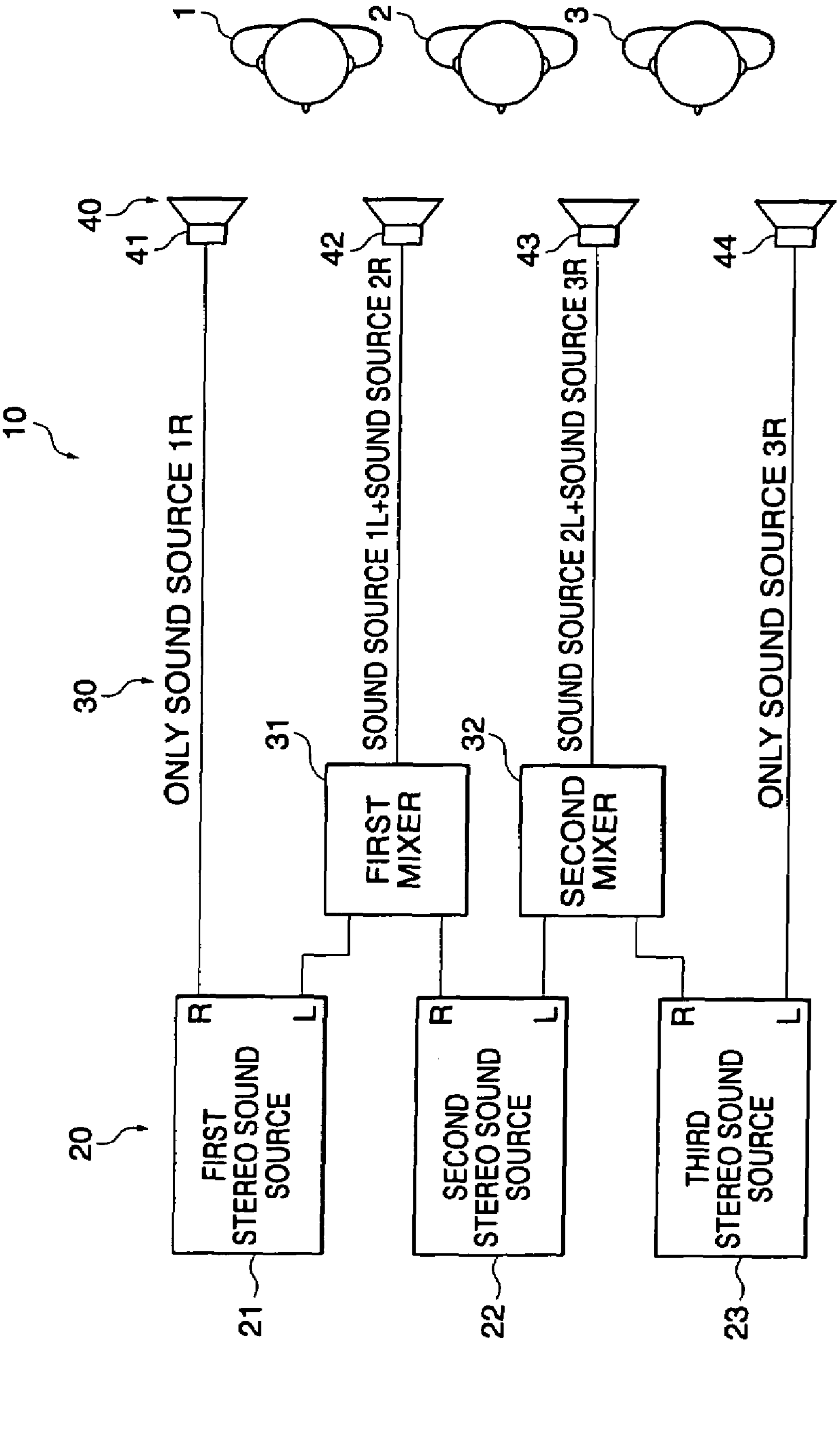
FIG. 3 is a view showing the arrangement of a stereo sounding system according to a second embodiment of the present invention.

FIG. 3 is a view showing the arrangement of the stereo sounding system 10 according to the second embodiment.

The stereo sounding system 10 is comprised of a mixing apparatus 30, which is connected to a stereo sound source apparatus 20 comprised of first to third stereo sound sources 21 to 23, and a speaker system 40.

The mixing apparatus 30 is comprised of first and second mixers 31 and 32, and the speaker system 40 is comprised of first to fourth speakers 41 to 44.

The first mixer 31 is connected to an L-channel of the first sound source 21 and an R-channel of the second stereo sound source 22, and mixes an L-channel output (sound source 1L) from the first stereo sound source 21 and an R-channel output (sound source 2R) from the second stereo sound source 22, and outputs the mixing result to the second speaker 42. Thus, the second speaker 42 serves as an L-channel speaker for the first stereo sound source 21 and an R-channel speaker for the second stereo sound source 22.

The second mixer 32 is connected to an L-channel of the second sound source 22 and an R-channel of the third stereo sound source 23, and mixes an L-channel output (sound source 2L) from the second stereo sound source 22 and an R-channel output (sound source 3R) from the third stereo sound source 23, and outputs the mixing result to the third speaker 43. Thus, the third speaker 43 serves as an L-channel speaker for the second stereo sound source 22 and an R-channel speaker for the third stereo sound source 23.

On the other hand, an R-channel output (sound source 1R) from the first stereo sound source 21 is directly output to the first speaker 41 without being mixed, and an L-channel output (sound source 3L) from the third stereo sound source 23 is directly output to the fourth speaker 44 without being mixed. Thus, the first speaker 42 serves as an R-channel speaker exclusively for the first stereo sound source 21, and the fourth speaker 44 serves as an L-channel speaker exclusively for the third stereo sound source 23.

Here, a listener 1 listens to the L-channel output (sound source 1L) from the second speaker 42 located diagonally ahead of him/her on the left and the R-channel output (sound source 1R) from the first speaker 41 located diagonally ahead of him/her on the right, and thus listens to a stereo sound from the first stereo sound source 21.

Similarly, a listener 2 who lies to the listener 1's immediate left listens to the L-channel output (sound source 2L) from the third speaker 43 located diagonally ahead of him/her on the left and the R-channel output (sound source 2R) from the second speaker 42 located diagonally ahead of him/her on the right, and thus listens to a stereo sound from the second stereo sound source 22. A listener 3 listens to the L-channel output (sound source 3L) from the fourth speaker 44 located diagonally ahead of him/her on the left and the R-channel output (sound source 3R) from the third speaker 43 located diagonally ahead of him/her on the right, and thus listens to a stereo sound from the third stereo sound source 23.

Figure 11:
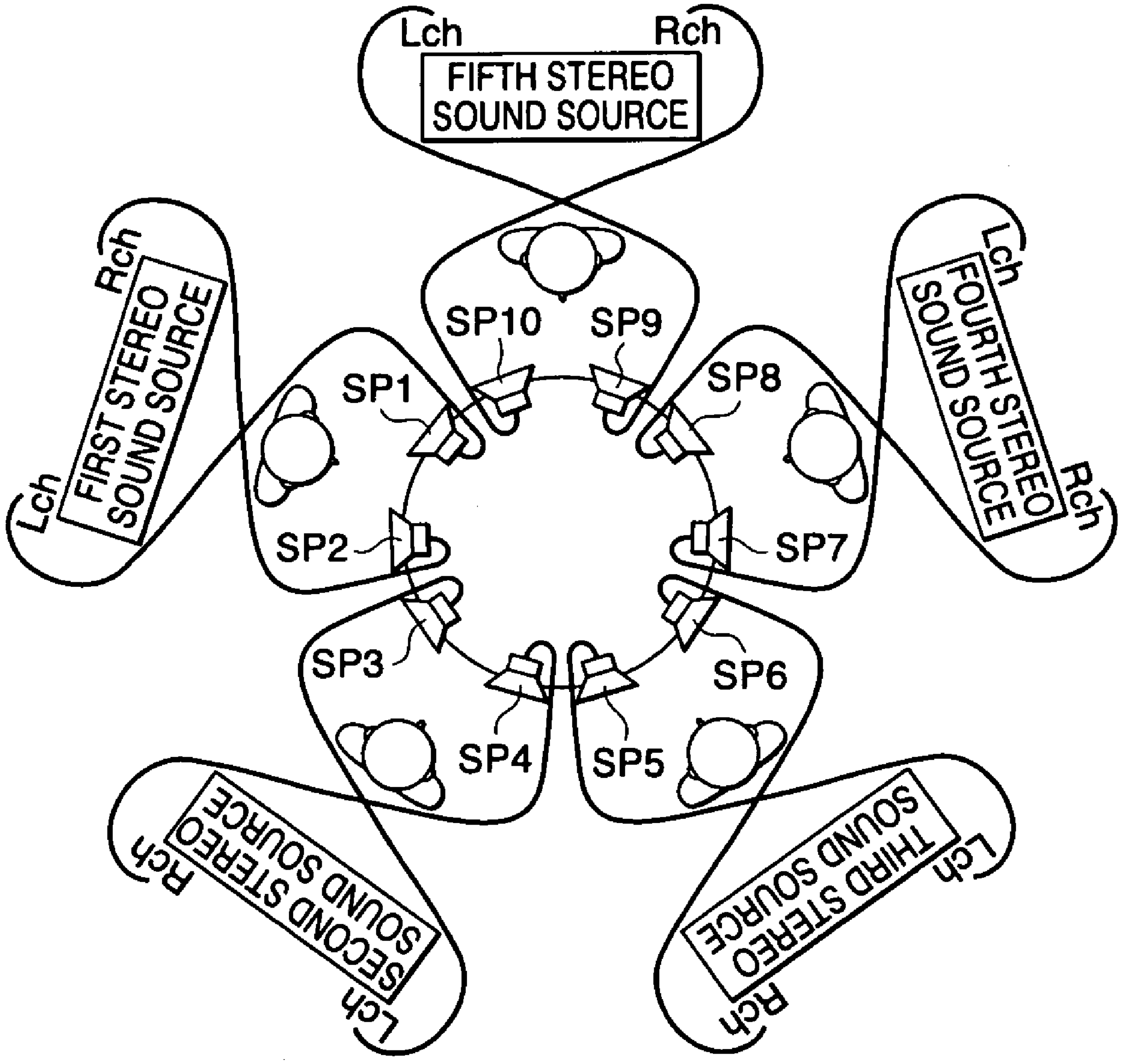
FIG. 11 PRIOR ART
FIG. 11 is a view showing the outline of still another conventional speaker system.

As described above, in the stereo sounding system according to the present embodiment as well, it is possible to reduce the number of speakers as compared with the prior art. Specifically, according to the prior art, two speakers are required for one stereo sound source so as to realize stereo sounds, and hence it is necessary to prepare twice as many speakers as stereo sound sources from which tones are to be reproduced (refer to FIG. 11), but according to the present embodiment, tones from a plurality of stereo sound sources can be sounded via a smaller number of speakers than twice the number of stereo sound sources.

Although in the present embodiment, the three stereo sound sources 21 to 23 are used, the present invention may be applied to all of embodiments in which a plurality of (two or more) stereo sound sources are used for stereo sounding. It should be noted that such embodiments are the same in basic arrangement as above, and therefore description thereof is omitted.

A description will now be given of a third embodiment of the present invention with reference to FIGS. 4 to 7.

Figure 4:
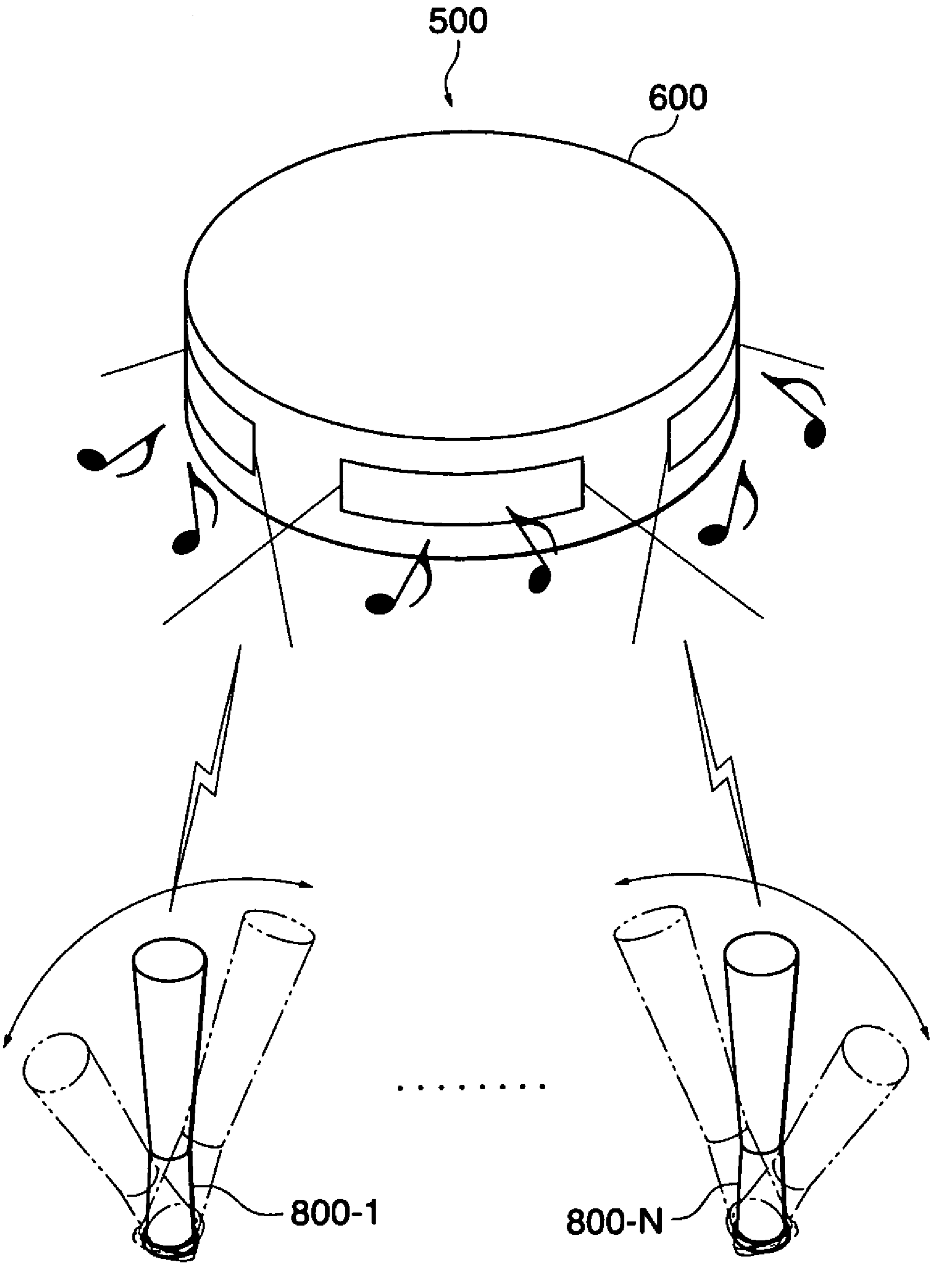
FIG. 4 is view useful in explaining the basic arrangement of a musical tone generation control system according to a third embodiment of the present invention.

FIG. 4 is a view useful in explaining the basic arrangement of a musical tone generation control system according to the third embodiment.

The musical tone generation control system 500 is employed in a music school, a general school, a home, a hall, and so forth, and is comprised of a musical tone generating apparatus 600 and a plurality of operating terminals 800-N (N≧1; in the present embodiment, it is assumed that N is 5) for each user to direct generation of musical tones by the musical tone generating apparatus 600.

In the musical tone generation control system 500 according to the present embodiment, the stereo sounding system 100 according to the above described first embodiment is used. A detailed description will now be given of the arrangement of the musical tone generation control system 500.

Figure 5:
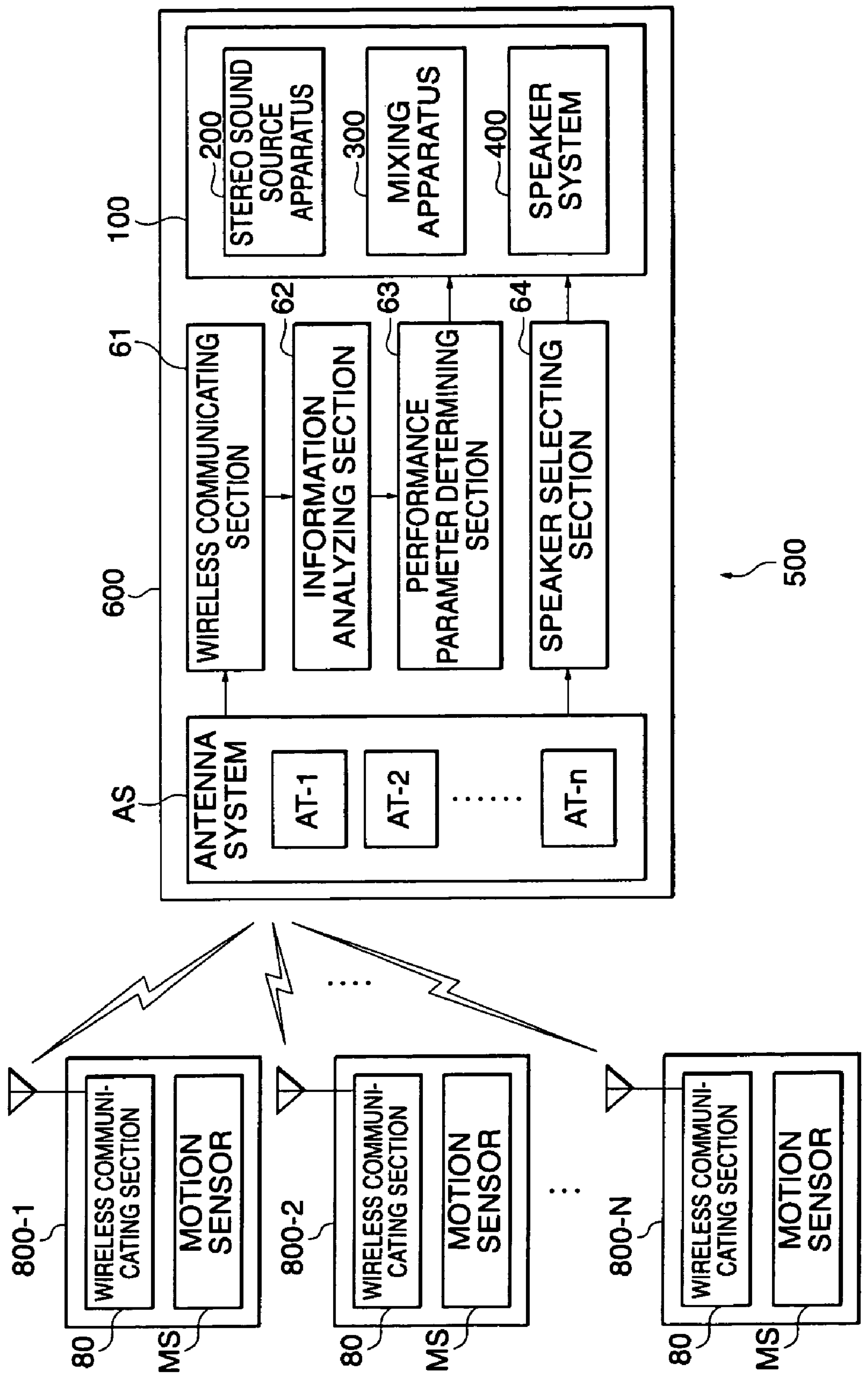
FIG. 5 is a view showing the functional arrangement of the musical tone generation control system in FIG. 4.

FIG. 5 is a view showing the functional arrangement of the musical tone generation control system 500 which is constructed in e.g. a certain music school. It should be noted that in the following description, it is assumed that an operating terminal 800-1 is used where it is unnecessary to discriminate the operating terminals 800-1 to 800-N. All the operating terminals 800 to 800-N have the same hardware construction.

The operating terminal 800-1 is capable of being carried by the operator; e.g. it is held by the operator's hand, or is put on a part of the operator's body. The operating terminal 800-1 is comprised of a wireless communicating section 80, and a motion sensor MS, which is provided with an x-axis detecting section SX, y-axis detecting section SY, and z-axis detecting section SZ as described later.

The motion sensor MS detects motion of the operator who is carrying the operating terminal 800-1 to generate motion information, and sequentially outputs the motion information to the wireless communicating section 80. It should be noted that examples of the motion sensor MS include at least one of a three-dimensional acceleration sensor, a three-dimensional velocity sensor, a two-dimensional acceleration sensor, a two-dimensional velocity sensor, and a strain sensor, which are conventionally known.

The wireless communicating section 80 carries out wireless data communication with the musical tone generating apparatus 600. Upon reception of motion information according to motion of the operator, the wireless communicating section 80 transmits the motion information with a terminal ID (e.g. T-ID1 for the operating terminal 800-1) for identifying the operating terminal 800-1 added thereto to the musical tone generating apparatus 600 by wireless.

The musical tone generating apparatus 600 is a substantially columnar apparatus which carries out generation of musical tones and others according to plural pieces of motion information transmitted from the respective operating terminals 800-1 to 800-N (refer to FIG. 4).

Referring again to FIG. 5, an antenna system AS included in the musical tone generating apparatus 600 is comprised of a plurality of antennas AT-1 to AT-n which receive plural pieces of motion information transmitted from the respective operating terminals 800-1 to 800-N. The antennas AT-1 to AT-n are arranged in a radial array in a housing of the musical tone generating apparatus 600. The antenna system AS constructed as above compares a plurality of reception levels detected by the respective antennas AT-1 to AT-n with each other to specify one of them with the highest reception level and transmit a piece of antenna identification information for identifying the specified antenna (e.g. A-ID1 for the antenna AT1) to a speaker selecting section 64.

A wireless communicating section 61 receives plural pieces of motion information, which has been transmitted from the respective operating terminals 800-1 to 800-N, via the antenna system AS, and outputs the received plural pieces of motion information to an information analyzing section 62.

The information analyzing section 62 carries out a predetermined analysis on the plural pieces of motion information supplied from the wireless communicating section 61, and outputs the analysis results to a performance parameter determining section 63.

The performance parameter determining section 63 determines musical tone performance parameters, e.g. volume and reverberation, of musical tones according to the results of analysis on the plural pieces of motion information, which is supplied from the information analyzing section 62.

Upon reception of musical composition data (e.g. MIDI (Musical Instrument Digital Interface) data) based on the performance parameters determined by the performance parameter determining section 63, the stereo sounding system 100 generates a musical tone signal based on the musical composition data and sounds it as e.g. a stereo sound. It should be noted that as in the above described first embodiment, the stereo sounding system 100 is comprised of the stereo sound source apparatus 200, and the mixing apparatus 300 and the speaker system 400 which are connected to the stereo sound source apparatus 200.

According to the antenna identification information transmitted from the antenna system AS, the speaker selecting section 64 selects a pair or pairs of speakers (hereinafter referred to as the pair of speakers) for use in stereo sounding from among a plurality of speakers constituting the speaker system 400. Specifically, first, the speaker selecting section 64 specifies the position of the operator according to the antenna identification information transmitted from the antenna system AS. Then, the speaker selecting section 64 selects the pair of speakers for use in stereo sounding from among the plurality of speakers constituting the speaker system 400 so that a stereo sound or the like can be sounded toward the specified position of the operator.

The functions of the operating terminals 800-1 to 800-N and the musical tone generating apparatus 600 described above are realized by cooperation between software and hardware resources provided in the operating terminals 800-1 to 800-N and the musical tone generating apparatus 600; a description will be given below only of what is considered necessary for understanding of the present invention, and as to the rest, description is omitted.

Figure 6:
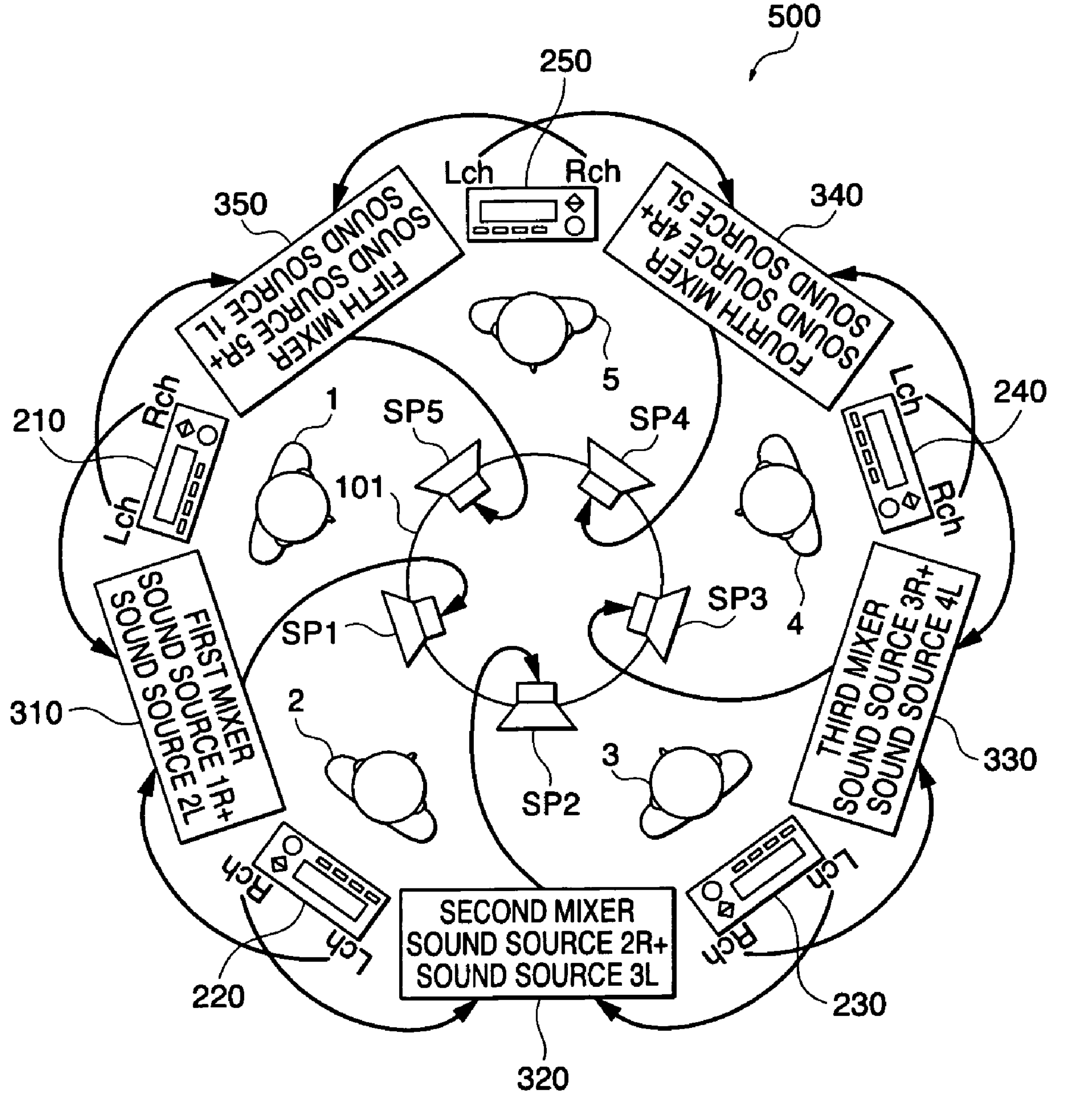
FIG. 6 is a view schematically showing the outline of the musical tone generation control system in FIG. 4.
Figure 7:
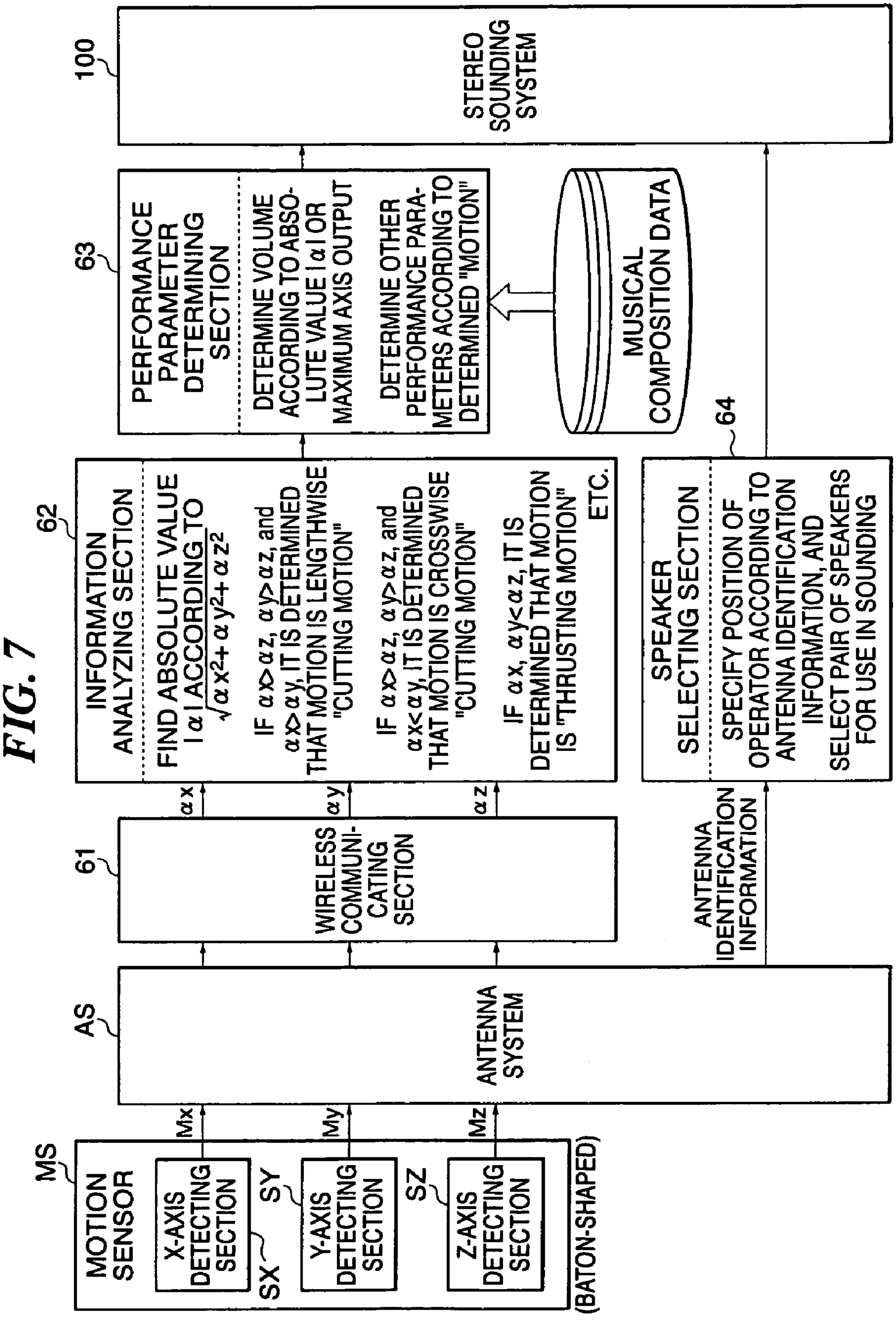
FIG. 7 is a block diagram useful in explaining the operation of the musical tone generation control system in FIG. 4.

Referring to FIGS. 5 to 7, a description will now be given of a motion information analyzing process, a performance parameter determining process, a musical tone generating process, and a speaker selecting process (these processes will be generically referred to as the musical tone generation control process) in the case where a three-dimensional acceleration sensor is employed as the motion sensor MS. In the following description, it is assumed that five operators play in concert using their respective operating terminals 800 (refer to FIG. 6).

First, the operators operates e.g. switches, not shown, of the musical tone generating apparatus 600 to e.g. select a musical composition to be played in concert and configure parts which they are in charge of. A description will now be given of an example of configuration of parts. For example, the parts are configured such that an operator 1 is in charge of a first musical instrument part (e.g. a piano part), an operator 2 is in charge of a second musical instrument part (e.g. a flute part), an operator 3 is in charge of a third musical instrument part (e.g. a violin part), an operator 4 is in charge of a fourth musical instrument part (e.g. a cymbals part), and an operator 5 is in charge of a fifth musical instrument part (e.g. a trumpet part). As a result of such configuration, a part management table, not shown, relating to the selected musical composition is registered in a memory, not shown, of the musical tone generating apparatus 600.

In the part management table, terminal identification IDs (e.g. T-ID1 for the operating terminal 800-1) for identifying the operating terminals 800 operated by the respective operators, and part IDs (e.g. P-ID1) for identifying musical instrument parts which the respective operators are in charge of are registered in association with each other.

With this configuration, for example, when the operator 1 moves while holding the operating terminal 800-1 which has the motion sensor MS incorporated therein, a piece of motion information according to the direction and force of the motion of the operator 1 (i.e. the moving direction and acceleration of the operating terminal 800-1) is transmitted from the operating terminal 800-1 to the musical tone generating apparatus 600. Specifically, as shown in FIG. 7, the x-axis detecting section SX, y-axis detecting section SY, and z-axis detecting section SZ of the motion sensor MS incorporated in the operating terminal 800-1 output respective signals Mx, My, and Mz, which are indicative of an acceleration ax (x is a subscript) in an x-direction (vertically as viewed from the operator), an acceleration ay (y is a subscript) in a y-direction (horizontally as viewed from the operator), and an acceleration az (z is a subscript) in a z-direction (back and forth as viewed from the operator), respectively. The above-mentioned terminal identification ID is added to each of the signals Mx, My, and Mz, which are then transmitted as motion information by wireless to the musical tone generating apparatus 600.

Upon reception of the motion information with the terminal identification ID added thereto from the operating terminal 800-1, the antenna system AS of the musical tone generating apparatus 600 compares a plurality of reception levels detected by the respective antennas AT-1 to AT-n with each other to specify one of them with the highest reception level, and generate antenna identification information for identifying the specified antenna and output the same to the speaker selecting section 64, and on the other hand, transmits the motion information to the wireless communicating section 61. The wireless communicating section 61 outputs the motion information, which has been received via the antenna system AS, as acceleration data ax, ay, and az to the information analyzing section 62.

Upon reception of the antenna identification information from the antenna system AS, the speaker selecting section 64 specifies the position of the operator 1 according to the antenna identification information. The speaker selecting section 64 selects the pair of speakers for use in stereo sounding from among the plurality of speakers constituting the speaker system 400 so that a stereo sound or the like can be sounded toward the specified position of the operator 1.

The above described processing, which involves transmitting information on motion of the operator 1 from the operating terminal 800-1 to the musical tone generating apparatus 600 and selecting the pair of speakers from the plurality of speakers, is also carried out by the operating terminals 800-2 to 800-5 held by the other operators 2 to 5 and the musical tone generating apparatus 600.

For example, assuming that the operators are positioned as shown in FIG. 6, the speaker selecting section 64 specifies the position of each operator according to each piece of antenna identification information to select the pair of speakers. Specifically, as to the first musical instrument part to be played by the operator 1, the speaker selecting section 64 selects a first speaker SP1 and a fifth speaker SP5 so that sounds such as stereo sound can be sounded via the first speaker SP1 and the fifth speaker SP5. Similarly, as to the second musical instrument part to be played by the operator 2, the speaker selecting section 64 selects the first speaker SP1 and a second speaker SP2 so that sounds such as stereo sounds can be sounded via the first speaker SP1 and the second speaker SP2. Similarly, as to the third musical instrument part to be played by the operator 3, the speaker selecting section 64 selects the second speaker SP2 and a third speaker SP3 so that sounds such as stereo sounds can be sounded via the second speaker SP2 and the third speaker SP3, and as to the fourth musical instrument part to be played by the operator 4, the speaker selecting section 64 selects the third speaker SP3 and a fourth speaker SP4 so that sounds such as stereo sounds can be sounded via the third speaker SP3 and the fourth speaker SP4. As to the fifth musical instrument part to be played by the operator 5, the speaker selecting section 64 selects the fourth speaker SP4 and a fifth speaker SP5 so that sounds such as stereo sounds can be sounded via the fourth speaker SP4 and the fifth speaker SP5. After selecting the pairs of speakers in this way, the speaker selecting section 64 notifies the selection result to the stereo sounding system 100.

On the other hand, upon reception of acceleration data on the respective axes from the wireless communicating section 61, the information analyzing section 62 analyzes the acceleration data on the respective axes to find the absolute value |a| of acceleration represented by the following expression (1):

$$|a|=(ax^2+ay^2+az^2)^{1/2} \quad (1)$$

Then, the information analyzing section 62 compares the accelerations ax and ay with the acceleration az. As a result of the comparison, if the acceleration az in the z-direction is greater than the accelerations ax and ay in the x- and y-directions, the information analyzing section 62 determines that motion information received by the wireless communicating section 61 is indicative of "thrusting motion" of the operator who holds the operating terminal 800.

On the other hand, if the acceleration az in the z-direction is smaller than the accelerations ax and ay in the x- and y-directions, the information analyzing section 62 determines that motion information received by the wireless communicating section 61 is indicative of "cutting motion" of the operator who holds the operating terminal 800. In this case, the accelerations ax and ay in the x- and y-directions are also compared with each other, and for example, if the accelerations ax in the x-direction is greater than the acceleration ay in the y-direction, the information analyzing section 62 determines that the direction of the "cutting motion" is a lengthwise (x) direction, i.e. a vertical direction as viewed from the operator.

On the other hand, if the accelerations ax in the x-direction is smaller than the acceleration ay in the y-direction, the information analyzing section 62 determines that the direction of the "cutting motion" is a crosswise (y) direction, i.e. a horizontal direction as viewed from the operator (such control is just an example).

In this way, the information analyzing section 62 analyzes the moving direction and acceleration of the operating terminal 800 in the above-described manner, and notifies the analysis result to the performance parameter determining section 63.

The performance parameter determining section 63 determines a variety of performance parameters for musical composition data according to the result of analysis carried out by the information analyzing section 62. For example, the volume of musical composition data is controlled according to the absolute value |a| or the magnitude of the maximum component among the components ax, ay, and az in the respective directions.

Also, the performance parameter determining section 63 controls other parameters according to the analysis result. For example, the performance parameter determining section 63 controls the depth of reverberation of musical composition data according to the repetition period of "lengthwise (x-direction) cutting motion". Aside from this, if determining that the "lengthwise cutting motion" is quick and small (i.e. the acceleration ax is greater than a predetermined value), the performance parameter determining section 63 applies articulation such as accent to musical composition data, and if determining that the "lengthwise cutting motion" is slow and wide (i.e. the acceleration ax is smaller than a predetermined value), the performance parameter determining section 63 lowers the tone pitch of musical composition data (such control is just an example).

When a plurality of performance parameters are determined by the performance parameter determining section 63, a piece of musical composition data which reflects the determined plurality of performance parameters is output to the stereo sounding system.

The stereo sounding system 100 causes the stereo sound source apparatus 200 (refer to FIG. 5) to generate a musical tone signal according to the piece of musical composition data supplied from the performance parameter determining section 63, and outputs the generated musical tone signal to the speaker system 400 via the mixing apparatus 300. As described above, the speaker selecting section 63 has already selected the pairs of speakers via which sounds such as stereo sounds should be sounded. Thus, the mixing apparatus 300 carries out mixing such that sounds such as stereo sounds of musical instrument parts which the respective operators are in charge of are sounded via the pairs of speakers selected by the speaker selecting section 64.

For example, in the case where a stereo sound of the first musical instrument part is generated by the first stereo sound source 210 (refer to FIG. 6), a stereo sound of the second musical instrument part is generated by the second stereo sound source 220, a stereo sound of the third musical instrument part is generated by the third stereo sound source 230, stereo sounds of the fourth musical instrument part is generated by the fourth stereo sound source 240, and a stereo sound of the fifth musical instrument part is generated by the fifth stereo sound source 250, the mixing apparatus 300 mixes an R-channel output (sound source 1R) from the first stereo sound source 210 and an L-channel output (sound source 2L) from the second stereo sound source 220, and outputs the mixing result to the first speaker SP1.

Further, the mixing apparatus 300 mixes an R-channel output (sound source 2R) from the second stereo sound source 220 and an L-channel output (sound source 3L) from the third stereo sound source 230, and outputs the mixing result to the second speaker SP2. The mixing apparatus 300 also mixes an R-channel output (sound source 3R) from the third stereo sound source 230 and an L-channel output (sound source 4L) from the fourth stereo sound source 240, and outputs the mixing result to the third speaker SP3. The mixing apparatus 300 also mixes an R-channel output (sound source 4R) from the fourth stereo sound source 240 and an L-channel output (sound source 5L) from the fifth stereo sound source 250, and outputs the mixing result to the fourth speaker SP4. The mixing apparatus 300 mixes an R-channel output (sound source 5R) from the fifth stereo sound source 250 and an L-channel output (sound source 1L) from the first stereo sound source 210, and outputs the mixing result to the fifth speaker SP5.

Consequently, the operator 1 listens to the L-channel output (tone generator 1L) sounded via the fifth speaker SP5 located diagonally ahead of him/her on the left and the R-channel output (tone generator 1R) sounded via the first speaker SP1 located diagonally ahead of him/her on the right, and as a result, listens to a stereo sound of the first musical instrument part.

Similarly, the operator 2 who lies to the operator 1's immediate right listens to the L-channel output (tone generator 2L) sounded via the first speaker SP1 located diagonally ahead of him/her on the left and the R-channel output (tone generator 2R) sounded via the second speaker SP2 located diagonally ahead of him/her on the right, and as a result, listens to a stereo sound of the second musical instrument part. The operator 3 who lies to the operator 2's immediate right listens to the L-channel output (tone generator 3L) sounded via the second speaker SP2 located diagonally ahead of him/her on the left and the R-channel output (tone generator 3R) sounded via the third speaker SP3 located diagonally ahead of him/her on the right, and as a result, listens to a stereo sound of the third musical instrument part. The operator 4 who lies to the operator 3's immediate right listens to the L-channel output (tone generator 4L) sounded via the third speaker SP3 located diagonally ahead of him/her on the left and the R-channel output (tone generator 4R) sounded via the fourth speaker SP4 located diagonally ahead of him/her on the right, and as a result, listens to a stereo sound of the fourth musical instrument part. The operator 5 who lies to the operator 4's immediate right listens to the L-channel output (tone generator 4L) sounded via the fourth speaker SP4 located diagonally ahead of him/her on the left and the R-channel output (tone generator 5R) sounded via the fifth speaker SP5 located diagonally ahead of him/her on the right, and as a result, listens to a stereo sound of the fifth musical instrument part. In this way, sounds such as stereo sounds of musical instrument parts which the respective operators are in charge of are sounded via the pairs of speakers located ahead of the respective operators. Therefore, each operator can play in concert while satisfactorily listening to sounds such as stereo sounds of a musical instrument part which he/she is in charge of.

As described above, according to the musical tone generation control system of the present embodiment, generation of musical tones and so forth are carried out in a manner reflecting the motion of each operator who is holding the operating terminal 800, and musical tones of a musical instrument part which he/she is in charge of are sounded via a pair of speakers opposed to the position of the operator which has been detected, and therefore, each operator can play in concert while satisfactorily listening to musical tones of musical instrument parts which reflect motion of each operator.

Although in the present embodiment, musical tones controlled using the operating terminal 800 are generated and sounded via speakers, musical tones sounded via speakers should not necessarily be musical tones generated by control using the operating terminal 800, but may be musical tones generated by playing a real musical instrument (such as a keyboard or a guitar). It should be noted that any kinds of musical tones may be sounded via each speaker in the present embodiment as well as in the above described embodiments.

A description will now be given of a fourth embodiment of the present invention with reference to FIG. 8.

Although in the above described first embodiment, a plurality of stereo sound sources, mixers, and speakers constitute the stereo sounding system, the present invention may also be applied to the case where one stereo sound source and a plurality of speakers constitute the stereo sounding system.

Figure 8:
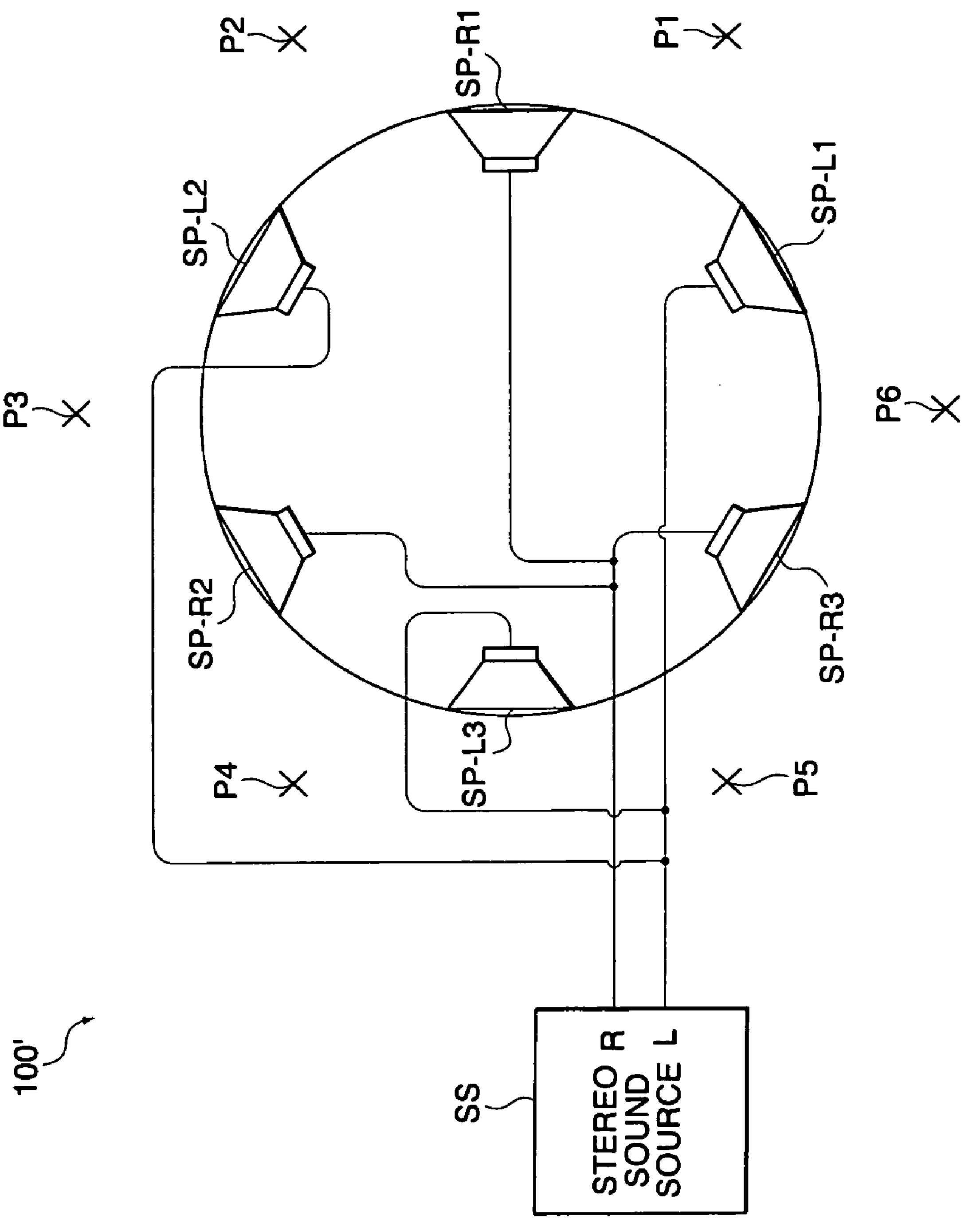
FIG. 8 is a view showing the arrangement of the musical tone generation control system according to a fourth embodiment of the present invention.
Figure 9:
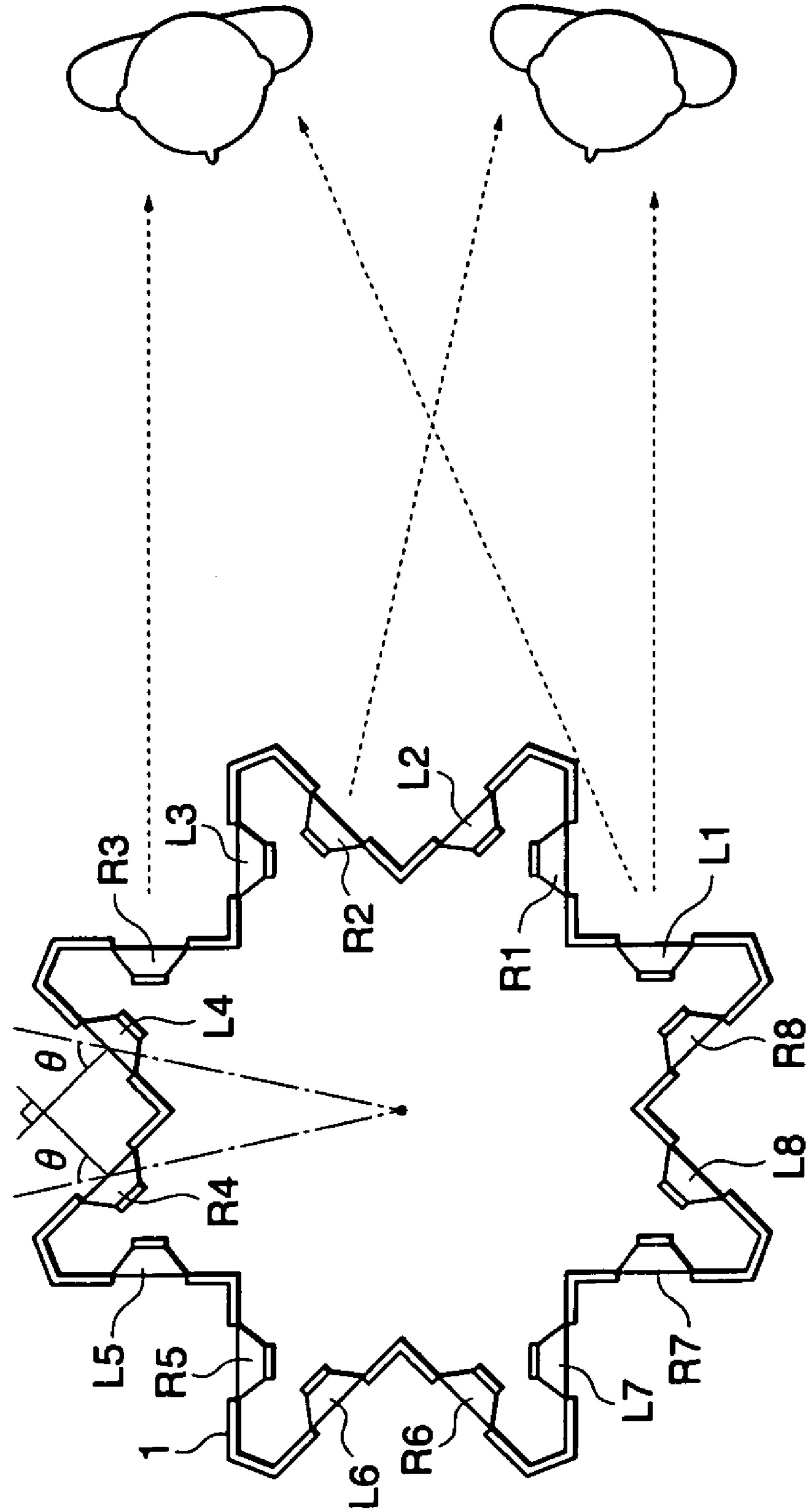
FIG. 9 PRIOR ART
FIG. 9 is a view showing the outline of a conventional speaker system.
Figure 10:
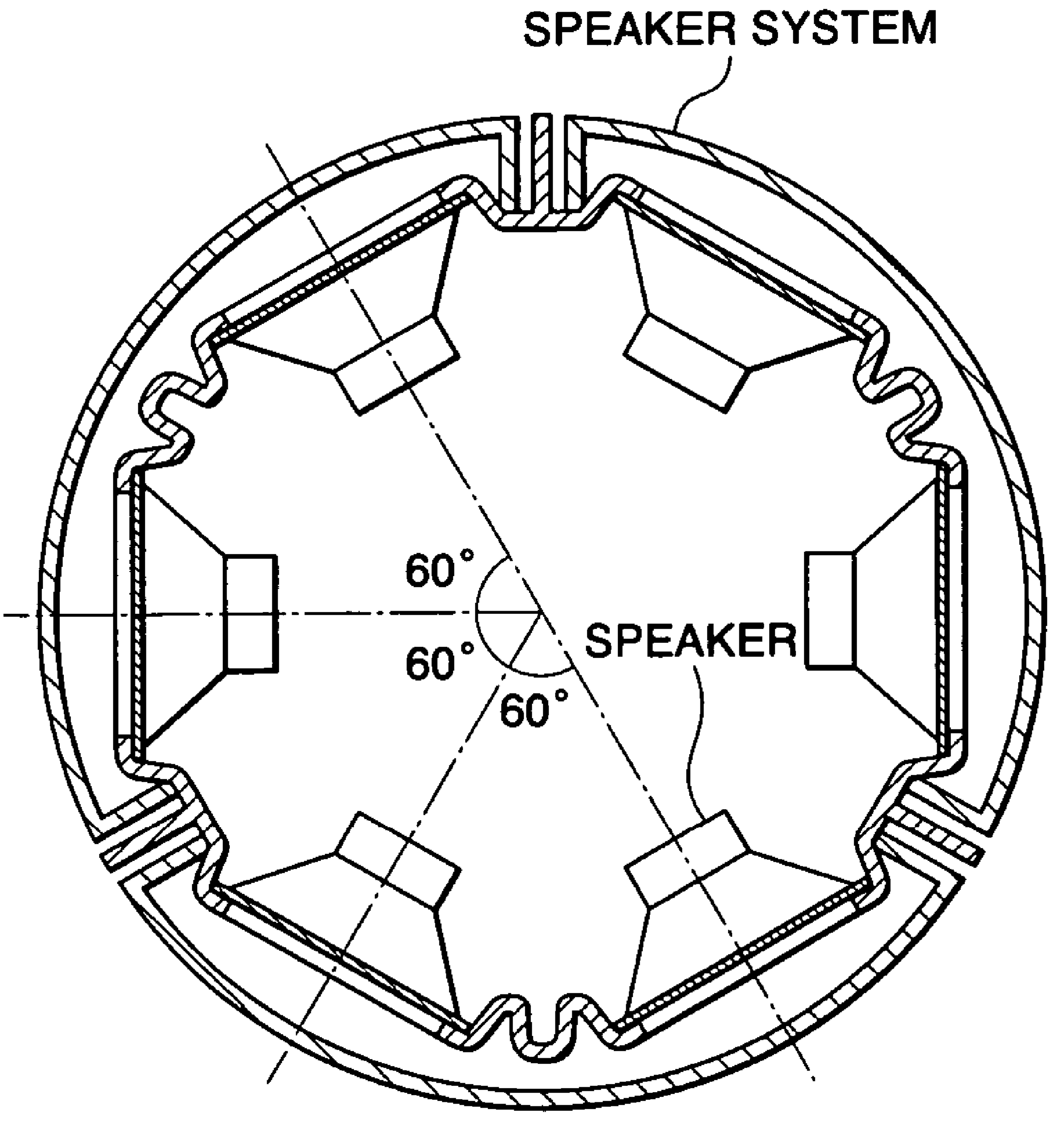
FIG. 10 PRIOR ART
FIG. 10 is a view showing the outline of another conventional speaker system.

FIG. 8 is a view showing the arrangement of a stereo sounding system 100' according to the fourth embodiment.

The stereo sounding system 100' is comprised of one stereo sound source SS, six speakers SP, and so forth. The six speakers SP are arranged at substantially regular intervals in a substantially circular array; three of them are connected to an L-channel of the stereo sound source SS, and the rest of them are connected to an R-channel of the stereo sound source SS. In FIG. 8 and the following description, for the convenience of explanation, the three speakers connected to the L-channel of the stereo sound source SS will be referred to as speakers SP-L1 to SP-L3, and the three speakers SP connected to the R-channel of the stereo sound source SS will be referred to as speakers SP-R1 to SP-R3.

As shown in FIG. 8, the six speakers SP are disposed such that adjacent speakers SP are connected to different channels of the stereo sound source SS. Specifically, to the speaker SP-L1's immediate right (in a counterclockwise direction), the speaker SP-R1 is disposed at a predetermined distance. To the speaker SP-R1's immediate right, the speaker SP-L2 is disposed at a predetermined distance. To the speaker SP-L2's immediate right, the speaker SP-R2 and the speaker SP-L3 are disposed in order at respective predetermined distances. To the speaker SP-L3's immediate right, the speaker SP-R3 is disposed at a predetermined distance.

Since the six speakers are thus arranged at substantially regular intervals along the route to be followed by the listener, he/she can listen at a point P1 in FIG. 8 to an L-channel output from the speaker SP-L1 located diagonally ahead of him/her on the left and an R-channel output from the speaker SP-R1 located diagonally ahead of him/her on the right, and as a result, listen to a stereo sound generated by the stereo sound source SS.

Then, when the listener moves to a point P2 in FIG. 8, he/she listens at the point P2 to an R-channel output from the speaker SP-R1 located diagonally ahead of him/her on the left and an L-channel output from the speaker SP-L2 located diagonally ahead of him/her on the right, and as a result, listen to a stereo sound generated by the stereo sound source SS.

Similarly, when the listener moves to a point P3 in FIG. 8, he/she listens at the point P3 to an L-channel output from the speaker SP-L2 located diagonally ahead of him/her on the left and an R-channel output from the speaker SP-R2 located diagonally ahead of him/her on the right, and as a result, listens to a stereo sound generated by the stereo sound source SS. When the listener moves to a point P4 in FIG. 8, he/she listens to an L-channel output from the speaker SP-L3 and an R-channel output from the speaker SP-R2, and as a result, listens to a stereo sound generated by the stereo sound source SS. When the listener moves to a point P5 in FIG. 8, he/she listens to an R-channel output from the speaker SP-R3 and an L-channel output from the speaker SP-L3, and as a result, listens to a stereo sound generated by the stereo sound source SS. When the listener moves to a point P6 in FIG. 8, he/she listens at the point P6 to an R-channel output from the speaker SP-R3 located diagonally ahead of him/her on the left and an L-channel output from the speaker SP-L1 located diagonally ahead of him/her on the right, and as a result, listens to a stereo sound generated by the stereo sound source SS.

As stated above, in the case where the stereo sounding system is comprised of one stereo sound source and a plurality of speakers, the same effects as in the first embodiment can be obtained, e.g. the number of speakers to be installed can be reduced as compared with the prior art. That is, according to the prior art, a pair of speakers consisting of an L-channel speaker and an R-channel speaker have to be installed in the listening direction of each listener, and hence to realize the same stereo sounding with substantially the same effects as in FIG. 8, a total of 12 speakers (i.e. six L-channel speakers and six R-channel speakers), but in the present embodiment, only six speakers are required to provide stereo sounding for the listener.

It should be noted that although in the present embodiment, six speakers are used, the present invention is not limited to this, but 2n ($n \geqq 2$) or more speakers may be used.

Further, although in the present embodiment, a plurality of speakers are arranged in a substantially circular array, the present invention is not limited to this, but they may be arranged in a substantially linear array as in the above described second embodiment. If a plurality of speakers are arranged in a substantially linear array, the same effects as in the present embodiment can be obtained by using at least three speakers.

Specifically, a stereo sounding method may be realized in a stereo sounding system in which three or more speakers are connected to an L-channel or an R-channel of one stereo sound source such that the speakers are arranged at substantially regular intervals and the speakers which are adjacent to each other are connected to different channels of the stereo sound source.

As described above, according to the present invention, it is possible to provide realistic stereo sounds for a large number of listeners while reducing the number of speakers.

What is claimed is:

1. A stereo sounding method for a stereo sounding system which comprises a plurality of stereo sound sources, and a plurality of speakers, comprising:

an arranging step of arranging the plurality of speakers; and a mixing output step of mixing an R-channel output from at least one stereo sound source among the plurality of stereo sound sources and an L-channel output from a stereo sound source other than the at least one stereo sound source, and outputting a mixing result to at least one of the arranged speakers.

2. A stereo sounding method as claimed in claim 1, wherein:

the number of the plurality of speakers is smaller than twice the number of the plurality of stereo sound sources.

3. A stereo sounding method as claimed in claim 1, wherein:

the number of the plurality of speakers is smaller than twice the number of the plurality of stereo sound sources;

in said mixing output step, the mixing result is output to at least two adjacent speakers of the arranaed speakers; and said mixing output step comprises carrying out mixing such that an R-channel output and an L-channel output from each stereo sound source among the plurality of stereo sound sources are output from two adjacent speakers of the arranged plurality of speakers, respectively.

4. A stereo sounding method as claimed in claim 1, wherein:

the number of the plurality of speakers corresponds to the number of the plurality of stereo sound sources, in said arranging step, the plurality of speakers are arranged in a substantially circular array, in said mixing output step, the mixing result is output to each of the arranged plurality of speakers, and said mixing output step comprises carrying out mixing such that an R-channel output and an L-channel output from each stereo sound source among the plurality of stereo sound sources are output from two adjacent speakers of the arranged plurality of speakers, respectively.

5. A stereo sounding system comprising:

a plurality of stereo sound sources;

a plurality of speakers; and at least one mixing apparatus that is connected to said plurality of stereo sound sources and said plurality of speakers such that said at least one mixing apparatus mixes an R-channel output from at least one stereo sound source among the plurality of stereo sound sources and an L-channel output from a stereo sound source other than the at least one stereo sound source, and outputs a mixing result to a speaker.

6. A stereo sounding system as claimed in claim 5, wherein:

said plurality of stereo sound sources are comprised of first to nth stereo sound sources where n is a natural number equal to or greater than 2;

said at least one mixing apparatus is comprised of first to nth mixing apparatuses;

said plurality of speakers are comprised of first to nth speakers arranged in ascending order in a substantially circular array;

said first to nth mixing apparatuses are connected to said first to nth stereo sound sources and said first to nth speakers such that, where k is a natural number equal to or greater than 1 and equal to or smaller than (n−1), a kth mixing apparatus mixes an R-channel output from a kth stereo sound source and an L-channel output from a (k+1)th stereo sound source, and outputs a mixing result to the kth speaker, and the nth mixing apparatus mixes an R-channel output from the nth stereo sound source and an L-channel output from the first stereo sound source, and outputs the mixing result to the nth speaker.

7. A stereo sounding system as claimed in claim 5, wherein:

the number of said plurality of speakers corresponds to said number of the plurality of stereo sound sources and said plurality of speakers are arranged in a substantially circular array;

said mixing apparatus outputs the mixing results to one of said at least one speaker connected to the at least one stereo sound source and the stereo sound source other than the at least one stereo sound source, and said mixing apparatus carries out mixing such that an R-channel output and an L-channel output from each stereo sound source of said plurality of stereo sound sources are output from two adjacent speakers of said plurality of speakers, respectively.

8. A musical tone generation control system comprising:

an operating terminal capable of being carried by an operator, comprising a generating device that detects motion of said operating terminal caused by motion of the operator and generates motion information, and a transmitting device that transmits the motion information; and a musical tone generating apparatus comprising a receiving device that receives the motion information, and a stereo sounding device that sounds a stereo sound based on the motion information received by said receiving device;

wherein said stereo sounding device comprises a plurality of stereo sound sources, a plurality of speakers, and a mixing apparatus that is connected to said plurality of stereo sound sources and said plurality of speakers such that said mixing apparatus mixes an R-channel output from at least one stereo sound source among the plurality of stereo sound sources and an L-channel output from a stereo sound source other than the at least one stereo sound source, and outputs a mixing result to a speaker.

9. A musical tone generation control system as claimed in claim 8, wherein:

the number of said plurality of speakers corresponds to said number of the plurality of stereo sound sources and said plurality of speakers are arranged in a substantially circular array;

said mixing apparatus outputs the mixing result to the speaker connected to the at least one stereo sound source and the stereo sound source other than the at least one stereo sound source; and said mixing apparatus carries out mixing such that an R-channel output and an L-channel output from each stereo sound source of said plurality of stereo sound sources are output from two adjacent speakers of said plurality of speakers, respectively.

* * * * *

UNITED STATES PATENT AND TRADEMARK OFFICE

CERTIFICATE OF CORRECTION

PATENT NO. : 7,512,246 B2
APPLICATION NO. : 10/834817
DATED : March 31, 2009
INVENTOR(S) : Nishitani et al.

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by (969) days Delete the phrase "by 969 days" and insert -- by 1372 days --

Signed and Sealed this

Fourth Day of May, 2010

David J. Kappos
*Director of the United States Patent and Trademark Office*